Jan. 9, 1962 A. DUERKSEN 3,015,845
VACUUM SYSTEM FOR TEMPORARY REDUCTION
OF THE DIAMETER OF A TIRE
Filed July 1, 1960 2 Sheets-Sheet 1
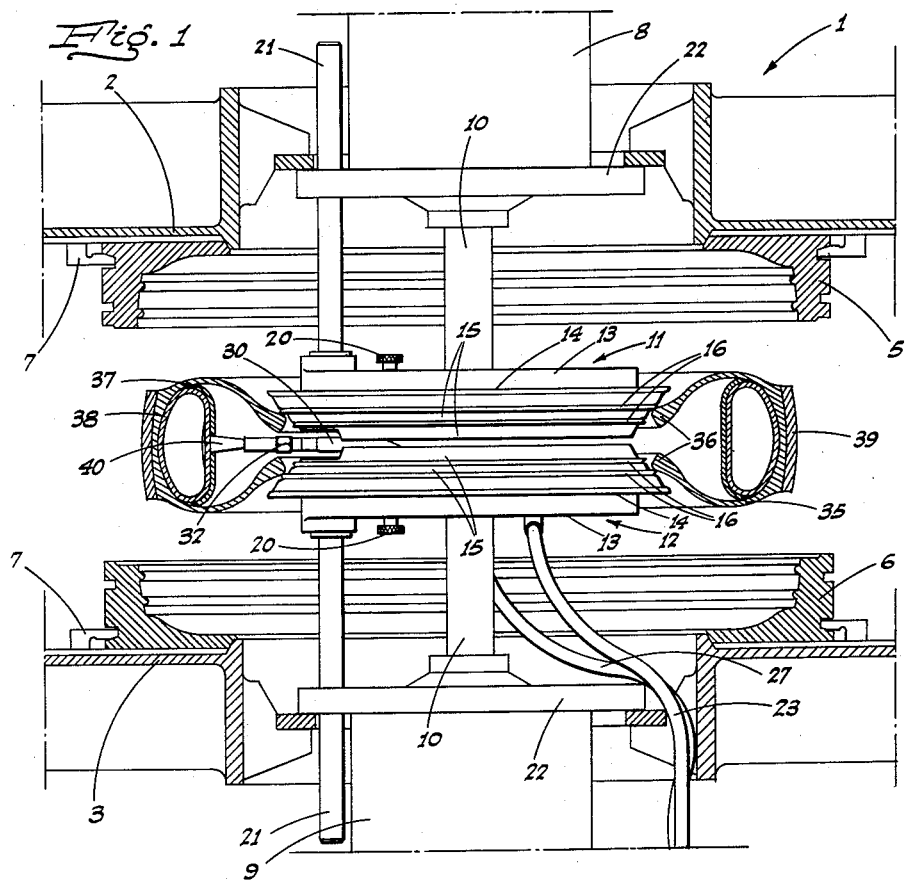
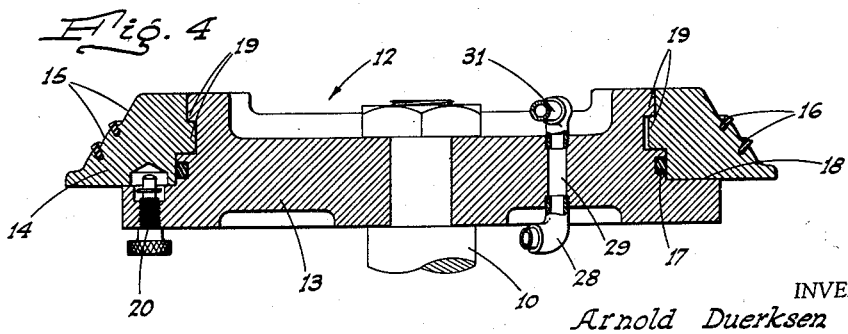
INVENTOR
Arnold Duerksen
BY Webster & Webster
ATTORNEYS

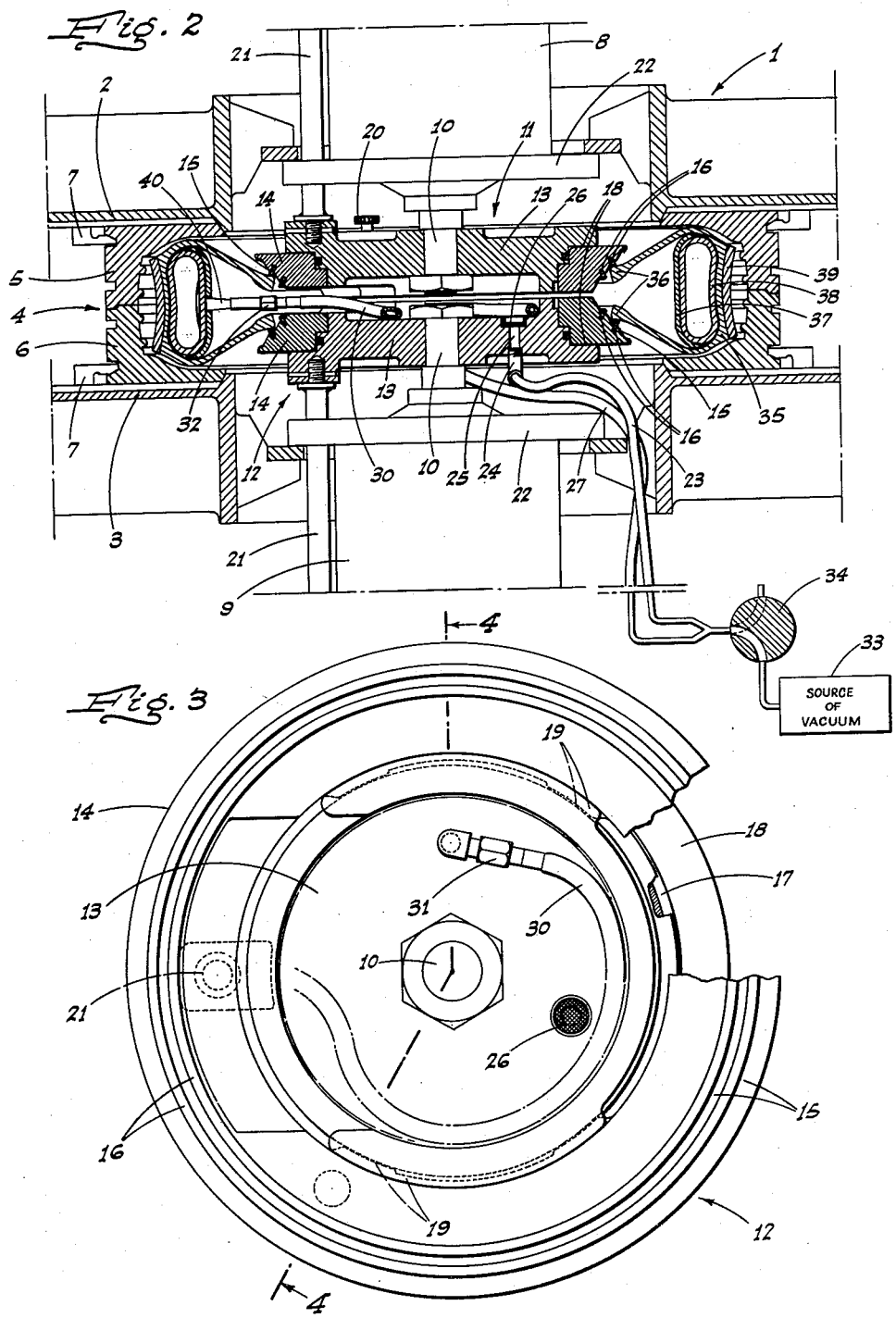

United States Patent Office 3,015,845
Patented Jan. 9, 1962

3,015,845
VACUUM SYSTEM FOR TEMPORARY REDUCTION OF THE DIAMETER OF A TIRE
Arnold Duerksen, Lodi, Calif., assignor to Super Mold Corporation of California, Lodi, Calif., a corporation of California
Filed July 1, 1960, Ser. No. 40,434
3 Claims. (Cl. 18—18)

This invention relates in general to the tire retreading industry, and more particularly to the loading and unloading of a tire from a retreading mold of portable, full-circle type which includes annular body-half or matrix sections normally in matching engagement but adapted to be axially separated.

It is a major object of this invention to provide a novel vacuum system for accomplishing temporary reduction in the diameter of a tire so as to facilitate its entry into—or removal from—a tire retreading mold, of the type described, without tread scuffing or chafing.

Another important object of the invention is to provide a vacuum system, as above, especially adapted—but not limited—for use in conjunction with a mold loading and unloading press wherein the mold is opened and closed by relative axial movement of the matrix sections; the vacuum system reducing the diameter of a tire to an extent that the mold can be closed on a tire prepared for retreading, or opened to remove the tire after vulcanization, without drag on the tread, and which would otherwise cause undesirable scuffing or chafing thereof.

Still another object of the invention is to provide a vacuum system, for the purpose described, which is operative to completely close the tire—on each side, and from bead to bead—to atmosphere, and to then subject the interior of said tire to vacuum sufficient to cause radially inward movement of the tread and resultant reduction in tire diameter; the tire, as usual, carrying an inside curing bag backed by an inside curing rim, the latter preventing laterally inward collapse of the tire sidewalls under the influence of the vacuum.

An additional object of the invention is to provide a vacuum sytsem, as in the preceding paragraph, which is also operative to subject the inside curing bag to internal vacuum, and so that such bag then does not impede the radial inward movement of the tread under the influence of the vacuum in the tire.

It is also an object of the invention to provide a practical and reliable vacuum system for temporary reduction of the diameter of a tire, and one which will be exceedingly effective for the purpose for which it is designed.

These objects are accomplished by means of such structure and relative arrangement of parts as will fully appear by a perusal of the following specification and claims.

In the drawings:
FIG. 1 is a fragmentary elevation, mainly in section, of a mold loading and unloading press embodying the present invention; the tire bead engaging disc units being shown as supporting the tire with the press and mold open, but before the reduction—by vacuum— of the diameter of the tire.

FIG. 2 is a similar view, but shows the press and mold closed, and particularly illustrates the reduction—by vacuum—of the diameter of the tire.

FIG. 3 is an enlarged plan view, partly broken away, of the lower tire bead engaging disc unit.

FIG. 4 is a cross section on line 4—4 of FIG. 3.

Referring now more particularly to the drawings and to the characters of reference marked thereon, the system is incorporated in a tire loading and unloading press, indicated at 1, and which press includes an upper horizontal platen 2 and a lower horizontal platen 3 adapted for movement, by power, between open position as in FIG. 1, and closed position as in FIG. 2.

The press 1 is adapted to open and close a portable, full-circle type tire retreading mold, indicated generally at 4, and which mold includes an upper annular matrix section 5 and a lower annular matrix section 6.

When the mold 4 is engaged in the press 1 the matrix sections 5 and 6 are secured, in axial alinement, to the platens 2 and 3, respectively, by releasable securing dogs 7, whereby when the press 1 is opened, as in FIG. 1, the mold is likewise opened; i.e., said matrix sections are relatively widely separated vertically.

Opposed upper and lower, double-acting power cylinders, indicated at 8 and 9, are vertically mounted in connection with the platens 2 and 3, respectively; such cylinders each including a piston rod 10, and which piston rods project toward each other in alinement with each other coaxially of the mold 4 as engaged in the press. At their outer or free ends the piston rods 10 are each fitted with a bead engaging disc unit, the upper unit being indicated generally at 11, while the lower unit is indicated generally at 12.

As the tire bead engaging units 11 and 12 are of substantially identical construction, except that one faces downwardly and the other upwardly, a description of one will suffice for both.

Each such tire bead engaging disc unit comprises an annular disc 13 attached centrally to the outer end of the related piston rod 10; such disc 13 being provided, in surrounding relation, with a tire bead engaging ring 14 peripherally staged or stepped, as at 15. Each such step carries an annular seal 16, while another annular seal 17 is engaged between the disc 13 and the ring 14.

The tire bead engaging ring 14 seats on a shoulder 18 of the disc 13, and is releasably secured to said disc by part-circle, bayonet type, locking assemblies 19 engaged by rotation of the ring 14 relative to the disc 13. When the ring 14 is locked to the disc 13 it is releasably maintained in such position by a set screw 20 threaded through said disc. The ring 14 is detachable from the disc 13 so that a substitute ring of a different diameter may be employed when necessary, and dependent on the tire and mold size.

Rotation of the tire bead engaging disc units 11 and 12 is prevented by means of a vertical guide rod 21 which extends from each such unit is slidable relation through the head plate 22 of the related power cylinder 8 or 9.

A flexible hose 23 is connected by a fitting 24 with the lower end of a vertical bore or passage 25 which extends through the disc 13 of the lower tire bead engaging disc unit 12; the other or upper end of such bore being provided with a screen 26.

Another flexible hose 27 is connected by a fitting 28 with the lower end of a separate vertical bore or passage 29 which extends through the disc 13 of the lower tire bead engaging disc unit 12.

A flexible hose 30, part-coiled on said disc 13, is coupled at one end in communication with the upper end of the bore 29 by a fitting 31; the opposite end of hose 30 remaining free and being provided with a snap-engageable coupling 32.

From the disc 13 of the lower tire bead engaging disc unit 12 the hoses 23 and 27 lead out of the press and are connected in valve-controlled relation to a source of vacuum, indicated at 33; the valve being shown at 34, and which valve is operative in one position to connect hoses 23 and 27 to said source of vacuum, and in another position to atmosphere.

To load a tire 35 into a mold 4 engaged in the press 1, the latter is first opened, separating the matrix sections 5 and 6 as in FIG. 1; the tire then being disposed in centered relation atop the lower matrix section 6. Nextly, the tire bead engaging disc units 11 and 12, which are initially retracted, are advanced toward each other by the power cylinders 8 and 9. When this occurs the tire beads 36 are engaged by one of the stages or steps 15 on the rings 14; the tire is elevated to the position as in FIG. 1; and the beads 16 are pressed toward each other from their normally separated positions.

When the beads are so pressed towards each other there is a certain amount of reduction in the diameter of the tire 35, which occurs by reason of the sidewalls of the tire being drawn inwardly about the edges of an inside curing rim 37 disposed in tire 35 in backing relation to an inside curing bag 38. However, the reduction in tire diameter is, in many instances, not sufficient for the matrix sections 5 and 6 to close on the tire without scuffing the new tread rubber or camelback 39.

In order to attain greater reduction in the diameter of the tire, vacuum is imposed—through hose 23—in the entire chamber formed by said tire and the tire bead engaging disc units which close the tire, on opposite sides, to atmosphere. This closure to atmosphere is assured by reason of engagement of the seals 16 with the tire beads 36, and the seal 17 between each disc 13 and the related ring 14.

Further, vacuum is imposed in the inside curing bag 38 through hoses 27 and 30; the coupling 32 on the free end of hose 30 having been previously snap-engaged with the stem 40 of said curing bag, and which stem projects through an opening in the inside curing rim 37.

Upon vacuum being imposed both within the tire 35, and within the curing bag 38, the diameter of the tire is materially reduced as illustrated in FIG. 2, and wherein the mold 4 is shown as closed by approaching movement of the platens 2 and 3 of press 1. It is to be understood of course that the vacuum reduction of the tire diameter takes place when the tire is supported as in FIG. 1, and before the mold is closed by the press.

After the tire is so reduced in diameter, and the mold closed by the press, the vacuum—both in the tire 35, and the inside curing bag 38—is relieved, whereupon the tire bead engaging disc units 11 and 12 are retracted from the tire; the tire 35 then reassuming its normal configuration within the closed mold.

The matrix sections 5 and 6 are next connected together in unitary relation by a locking ring (not shown), and thereupon—after release of the securing dogs 7, and opening of the press—the mold 4, with the tire 35 therein, is removed from the press and transported to a vulcanizing station.

After tread vulcaniation of the tire at such station, and which is accomplished, with the inside curing bag inflated, by heating elements (not shown) within the matrix sections 5 and 6, the mold 4 is returned to the press and the tire is unloaded from said mold by generally a reversal of the hereinbefore described loading procedure, and which includes vacuum reduction of the tire diameter so that it can be withdrawn from the matrix sections 5 and 6 without damage to the tread.

From the foregoing description it will be readily seen that there has been produced such a system as will substantially fulfill the objects of the invention as set forth herein.

While this specification sets forth in detail the present and preferred steps of the system, still in practice such deviations therefrom may be resorted to as do not form a departure from the spirit of the invention as defined by the appended claims.

Having thus described the invention the following is claimed as new and useful, and upon which Letters Patent are desired:

1. In an apparatus for temporary reduction of the diameter of a tire preparatory to entry into or removal from a tread vulcanizing mold, the tire having an inside curing bag therein; a solid closure disc for each side of the tire having a seal-forming seat for the corresponding bead of the tire whereby the area between the discs and leading into the tire is closed to atmosphere, mounting means for the discs to releasably maintain the same in such bead engagement, a source of vacuum, the curing bag being provided with a stem opening into said area, a pair of separated passages extending through one disc substantially parallel to and radially out from the axis thereof, a flexible conduit connected at one end to the inner end of one passage and adapted at the other end for detachable connection with said stem, and other conduits connected at one end to the outer ends of both passages and at their other ends to the source of vacuum.

2. In an apparatus for temporary reduction of the diameter of a tire preparatory to entry into or removal from a tread vulcanizing mold; a solid closure disc for each side of the tire having a seal-forming seat for the corresponding bead of the tire whereby the area between the discs and leading into the tire is closed to atmosphere, means mounting the discs for movement toward each other from an initial bead engaging position, a source of vacuum, and means connecting such area to said source; said seat comprising an annular seal arranged and positioned to engage the related bead on the laterally outer face thereof in air sealing relation in all positions of the discs relative to each other, and of the beads relative to the discs.

3. In an apparatus for temporary reduction of the diameter of a tire preparatory to entry into or removal from a tread vulcanizing mold; opposed members to engage the laterally outer faces of the beads of the tire, means to move said members toward each other to similarly move the beads so as to reduce the diameter of the tire, and means to then subject the interior of the tire to a tendency to vacuum to further reduce the diameter of the tire.

References Cited in the file of this patent
UNITED STATES PATENTS

| | | |
|---|---|---|
| 2,835,921 | White | May 27, 1958 |
| 2,908,939 | Eriksen et al. | Oct. 20, 1959 |
| 2,957,677 | Duerksen | Oct. 25, 1960 |